United States Patent
Droz et al.

(10) Patent No.: US 10,649,160 B2
(45) Date of Patent: May 12, 2020

(54) TRANSMITTER DEVICES HAVING BRIDGE STRUCTURES

(71) Applicant: Waymo LLC, Mountain View, CA (US)

(72) Inventors: Pierre-Yves Droz, Los Altos, CA (US); David Schleuning, Piedmont, CA (US); Augusto Tazzoli, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/669,488

(22) Filed: Oct. 30, 2019

(65) Prior Publication Data

US 2020/0088958 A1    Mar. 19, 2020

Related U.S. Application Data

(63) Continuation of application No. 16/406,322, filed on May 8, 2019, now Pat. No. 10,473,870, which is a continuation of application No. 16/133,452, filed on Sep. 17, 2018, now Pat. No. 10,310,197.

(51) Int. Cl.
  *G02B 6/42* (2006.01)
  *G01S 17/00* (2020.01)
  *F21K 9/00* (2016.01)

(52) U.S. Cl.
  CPC .............. *G02B 6/424* (2013.01); *G01S 17/00* (2013.01); *G02B 6/4204* (2013.01); *G02B 6/4245* (2013.01); *F21K 9/00* (2013.01); *G02B 6/4214* (2013.01); *G02B 6/4244* (2013.01)

(58) Field of Classification Search
  None
  See application file for complete search history.

(56) References Cited

U.S. PATENT DOCUMENTS

| | | | |
|---|---|---|---|
| 6,381,022 B1 | 4/2002 | Zavracky | |
| 8,773,012 B2 | 7/2014 | Ryu et al. | |
| 9,188,743 B2 | 11/2015 | Choraku et al. | |
| 2006/0077778 A1 | 4/2006 | Tatum et al. | |
| 2008/0290351 A1 | 11/2008 | Ajiki et al. | |
| 2012/0320581 A1 | 12/2012 | Rogers et al. | |
| 2013/0330035 A1 | 12/2013 | Shin et al. | |
| 2014/0185121 A1 | 7/2014 | Taraschi et al. | |
| 2015/0010270 A1 | 1/2015 | Oppermann | |
| 2018/0011266 A1 | 1/2018 | Omori et al. | |

FOREIGN PATENT DOCUMENTS

| | | |
|---|---|---|
| EP | 1480302 | 11/2007 |
| JP | 2017-116694 | 6/2017 |
| KR | 2013-0137448 | 12/2013 |

*Primary Examiner* — Jerry Rahll
(74) *Attorney, Agent, or Firm* — McDonnell Boehnen Hulbert and Berghoff LLP

(57) ABSTRACT

The present disclosure relates to optical systems and methods for their manufacture. An example system includes a first substrate that has at least one bridge structure. The bridge structure has a first surface with one or more light-emitter devices disposed on it. The system also includes a second substrate that has a mounting surface that defines a reference plane. The second substrate includes a structure and an optical spacer on the mounting surface. The first and second substrates are coupled together such that the first surface of the first substrate faces the second substrate at an angle with respect to the reference plane. The system also includes at least one spacer coupled to the mounting surface. The at least one spacer is in physical contact with the one or more light-emitter devices.

20 Claims, 13 Drawing Sheets

TRANSMITTER DEVICES HAVING BRIDGE STRUCTURES

CROSS REFERENCE TO RELATED APPLICATIONS

This application is a continuation of U.S. patent application Ser. No. 16/406,322 filed May 8, 2019, which is a continuation of U.S. patent application Ser. No. 16/133,452 filed Sep. 17, 2018, the contents of both of which are incorporated herein by reference in their entirety.

BACKGROUND

Achieving and maintaining proper alignment between optical components in a complex optical system can represent a formidable manufacturing challenge. For example, some optical systems include parts that should be arranged according to placement tolerances that can be 50 microns, 10 microns, or even less.

SUMMARY

In a first aspect, an optical system is provided. The optical system includes a first substrate having at least one bridge structure. The bridge structure includes a first surface. One or more light-emitter devices are disposed on the first surface. The optical system also includes a second substrate. The second substrate has a mounting surface that defines a reference plane. The second substrate includes a structure and an optical spacer on the mounting surface. The first substrate and the second substrate are coupled together such that a first portion of the first substrate is coupled to the optical spacer on the mounting surface of the second substrate and the first surface of the first substrate faces the mounting surface of the second substrate at an angle with respect to the reference plane. The optical system yet further includes at least one spacer coupled to the mounting surface. The at least one spacer is in physical contact with the one or more light-emitter devices.

In a second aspect, a method of manufacturing an optical system is provided. The method includes forming at least one bridge structure in a first substrate. The bridge structure comprises a first surface. The method also includes attaching one or more light-emitter devices to the first surface of the bridge structure. The method additionally includes providing a second substrate. The second substrate has a mounting surface that defines a reference plane. The method yet further includes forming a structure and an optical spacer on the mounting surface of the second substrate. The method also includes coupling at least one spacer to the mounting surface of the second substrate. The method additionally includes coupling the first and second substrates together such that a first portion of the first substrate is coupled to the mounting surface of the second substrate and a second portion of the first substrate is coupled to the optical spacer formed on the mounting surface of the second substrate and the first surface of the first substrate faces the mounting surface of the second substrate at an angle with respect to the reference plane. The at least one spacer is in physical contact with the one or more light-emitter devices.

DETAILED DESCRIPTION

Figure 1:
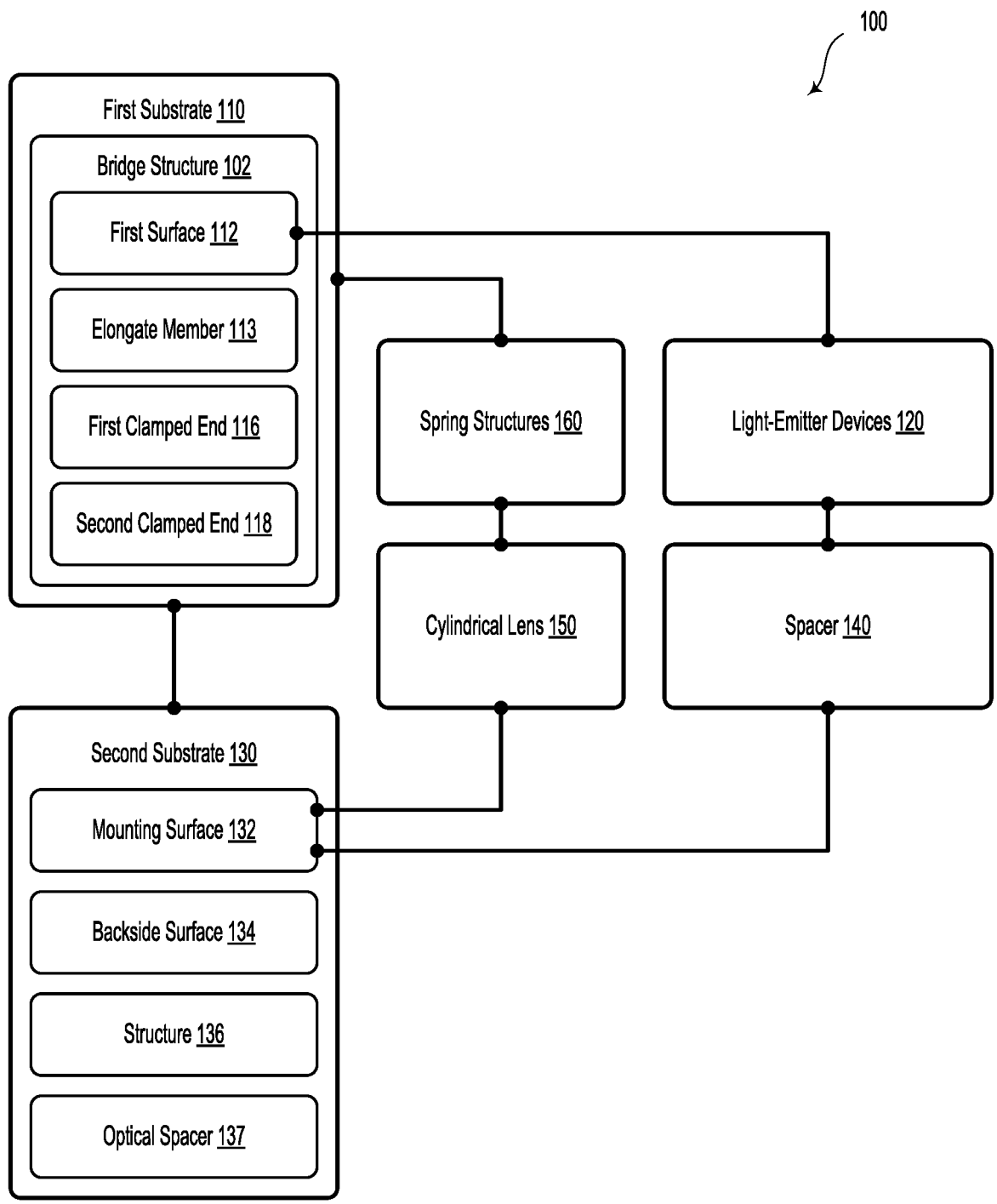
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure provides systems and methods for optical transmitter devices that incorporate a bridge structure. In some examples, two light-emitter devices (e.g., laser diodes) could be arranged along a surface of the bridge structure, which could be provided as a portion of a first substrate. Respective top surfaces of the light-emitter devices (opposite the surfaces of the light-emitter devices that are coupled to the bridge structure) could be in physical contact with a spacer. The spacer could exert a contact pressure on the light-emitter devices. In some embodiments, the spacer could be attached to a second substrate that includes a cylindrical lens and light guide manifold (e.g., a waveguide or a light pipe).

In some embodiments, the disclosed bridge structures can flex when in contact with the spacer so as to beneficially provide more reliable alignment of the light-emitter devices with the corresponding cylindrical lens and optical waveguide elements on the second substrate. By placing two light-emitter devices on the bridge structure, both light-emitter devices can be aligned with the cylindrical lens at the same time. Furthermore, height differences between the two light-emitter devices can be compensated or accommodated by a torsional bending of the bridge structure. Furthermore, variations in bonding material thickness between the first substrate and the respective light-emitter devices can be mitigated with such bending.

In some example embodiments, the bridge structures could be 5 mm long by 1 mm wide. However, other lengths and widths are possible. In addition, the aspect ratio (length/width) could be adjusted based on a desired spring constant of the bridge structure and/or an actual or anticipated height variation between the light-emitter devices on the first substrate.

Yet further, systems and methods described herein may provide some degree of vibration isolation due to the spring force of the bridge structure. Namely, vibrations induced in one or both of the first substrate or second substrate could be at least partially damped by the bridge structure.

In some examples, the bridge structure and/or the first substrate could be formed from printed circuit board or flexible printed circuit board material. In some embodiments, the first substrate could be approximately 200 microns thick. However, other materials are contemplated and possible. The bridge structures could be formed using a photolithography mask process followed by an anisotropic or isotropic etch process. In an example embodiment, the bridge structures could be laser cut or computer numerical control (CNC) milled from bulk substrate materials. Other additive or subtractive semiconductor/packaging manufacturing methods are contemplated herein.

In some embodiments, both light-emitter devices could be controlled by a single GaNFET driver circuit. Namely, the light-emitter devices could be connected in a series or parallel arrangement in the driver circuit and could be fired simultaneously and/or separately when the optical transmitter device is in operation. In such scenarios, at least a portion of the driver circuit could be incorporated on the bridge structure.

While a pair of light-emitter devices and a corresponding single bridge structure is described above, it will be understood that a plurality of bridge structures is contemplated herein. Thus, an example embodiment could include 10 or more bridge structures corresponding to 20 or more light-emitter devices. In some examples, light emission from light-emitter devices located on respective bridge structures could be individually controlled.

Other aspects, embodiments, and implementations will become apparent to those of ordinary skill in the art by reading the following detailed description, with reference where appropriate to the accompanying drawings.

II. Example Systems

FIG. 1 illustrates an optical system 100, according to an example embodiment. Optical system 100 could be utilized in various compact LIDAR systems. Such LIDAR systems may be configured to provide information (e.g., point cloud data) about one or more objects (e.g., distance, shape, etc.) in a given environment. In an example embodiment, the LIDAR system could provide point cloud information, object information, mapping information, or other information to a vehicle. The vehicle could be a semi- or fully-automated vehicle. For instance, the vehicle could be a self-driving car, an autonomous drone aircraft, an autonomous truck, or an autonomous robot. Other types of vehicles and LIDAR systems are contemplated herein.

The optical system 100 includes a first substrate 110. In some examples, the first substrate 110 could be approximately 200 microns thick. However, other thicknesses are possible and contemplated. In some embodiments, the first substrate 110 is a printed circuit board (PCB). In some other embodiments, the first substrate 110 could include a semiconductor substrate material such as silicon, gallium arsenide, or the like. In some embodiments, the first substrate 110 could include a silicon-on-insulator (SOI) material or aluminum nitride. Alternatively, the first substrate 110 could be formed from a variety of other solid and/or flexible materials, each of which is contemplated in the present disclosure.

The first substrate 110 includes at least one bridge structure 102. The bridge structure 102 includes a first surface 112. In some embodiments, the bridge structure 102 is defined by at least one cutout. The at least one cutout could include an opening in the first substrate 110. The at least one cutout could be formed by laser cutting or mechanical routing. Additionally or alternatively, the at least one cutout could be formed using a lithographically-defined wet or dry etch process. In such embodiments, the bridge structure 102 could be defined by two cutouts. In such scenarios, the bridge structure 102 could include an elongate member 113 that extends between a first support end 116, and a second support end 118. In some embodiments, the optical system 100 could include a plurality of bridge structures 102 defined by a plurality of cutouts.

One or more light-emitter devices 120 are disposed on the first surface 112. The light-emitter devices 120 could be configured to provide light pulses in infrared wavelengths (e.g., 905 nm). Other wavelengths and wavelength ranges are possible and contemplated. The light-emitter devices 120 could each include one or more laser bars or another type of light-emitting structure. In some embodiments, a driver circuit and/or control circuitry (e.g., pulser circuits) for the light-emitter devices 120 could also be disposed along the first surface 112 of the first substrate 110. In other embodiments, the control circuitry could be located elsewhere.

The optical system 100 also includes a second substrate 130 that has a mounting surface 132 that defines a reference plane. The second substrate 130 includes a structure 136 and an optical spacer 137 on the mounting surface 132. In some cases, the structure 136 may be formed from a polymeric material, such as photoresist. For example, the polymeric material may include SU-8 polymer, Kloe K-CL negative photoresist, Dow PHOTOPOSIT negative photoresist, or JSR negative tone THB photoresist. It will be understood that the structure 136 may be formed from other polymeric photo-patternable materials. The structure 136 could be a photo-patterned material layer that is 400 microns thick. However, the structure 136 could be a different thickness.

In some embodiments, the structure 136 on the mounting surface 132 could include an optical waveguide. For example, the optical waveguide could be configured to efficiently guide light along a propagation direction. For example, the structure 136 may be configured to couple light emitted from the plurality of light-emitter devices 120. At least a portion of such light may be guided within at least a portion of the structure 136 via total internal reflection and/or evanescent optical coupling. In some embodiments, the structure 136 may include one or more reflective surfaces configured to direct light normal to the propagation direction. In such a scenario, at least a portion of the light may be coupled out of the structure 136 via a mirrored facet.

In some embodiments, the optical spacer 137 could be provided to improve optical isolation between the structure 136 and the first substrate 110 and/or to preserve the light guiding properties of the structure 136. For instance, in some scenarios, the optical spacer 137 could include a partially-etched stainless steel spacer that forms a "tunnel" or air gap around the structure 136. In other words, such an optical spacer 137 could be directly "sandwiched" between the first substrate 110 and the second substrate 130 in the region of the structure 136. That is, air—or another material with a low refractive index with respect to that of the structure 136—could surround at least a portion of the structure 136. In such scenarios, the structure 136 need not be directly coupled to the first substrate 110, but rather could be indirectly coupled to the first substrate 110 by way of the optical spacer 137.

Put another way, in some embodiments, the optical spacer 137 may provide a "scaffolding" around the structure 136 so as to prevent the first substrate 110 from physically touching the structure 136. The optical spacer 137 could be formed from copper, stainless steel, or a nickel-cobalt ferrous alloy such as Kovar. Additionally or alternatively, the material of the optical spacer 137 could be selected based on its coefficient of thermal expansion (CTE). Specifically, the optical spacer 137 could be formed from a material that has a CTE similar (e.g., within 10% or 1%) to that of the second substrate 130.

The first substrate 110 and the second substrate 130 are coupled together such that a first portion of the first substrate 110 (e.g., the first support end 116 of the bridge structure 102) is coupled to the optical spacer 137 on the mounting surface 132 of the second substrate 130 and the first surface 112 of the first substrate 110 faces the mounting surface 132 of the second substrate 130 at an angle with respect to the reference plane.

The optical system 100 additionally includes at least one spacer 140 coupled to the mounting surface 132. The at least one spacer 140 is in physical contact with the one or more light-emitter devices 120.

In some embodiments, the first support end 116 and the second support end 118 of the bridge structure 102 define a plane. In such a scenario, the elongate member 113 of the bridge structure 102 is deformable with respect to the plane.

Additionally or alternatively, the bridge structure 102 could include a longitudinal axis. In such scenarios, the bridge structure 102 could be configured to bend according to a transverse mode with respect to the longitudinal axis.

Furthermore, the bridge structure 102 could include a longitudinal axis. In such example embodiments, the bridge structure 102 could be configured to bend according to a torsional mode with respect to the longitudinal axis. Within the context of this disclosure, such torsional bending may be important to provide self-correcting aspects of the optical system 100 in view of part tolerances, and other size/shape/alignment non-uniformities.

In some embodiments, the at least one spacer 140 could be an optical fiber spacer. That is, the spacer 140 could be formed from an optical fiber. In some embodiments, the at least one spacer 140 could be cylindrical with a diameter between 40-60 microns. However, other diameters or shapes for the at least one spacer 140 are possible and contemplated. In some embodiments, the at least one spacer 140 could be coupled to the mounting surface 132 with epoxy or another type of adhesive. Additionally or alternatively, the at least one spacer 140 could be disposed between at least one pair of three-dimensional alignment structures (e.g., three-dimensional alignment structures 142, as described elsewhere herein). The at least one pair of three-dimensional alignment structures could be configured to secure the at least one spacer 140 from moving away to a predetermined location.

In example embodiments, the optical system 100 could include at least one cylindrical lens 150 coupled to the mounting surface 132. In such scenarios, the one or more light-emitter devices 120 could be arranged to emit light towards the at least one cylindrical lens 150. In some embodiments, the at least one cylindrical lens 150 could include an optical fiber lens. Furthermore, the optical fiber lens could have a radius greater than that of the optical fiber spacer.

In some embodiments, the at least one cylindrical lens 150 could be coupled to the mounting surface 132 with epoxy or another type of adhesive. Additionally or alternatively, the at least one cylindrical lens 150 could be disposed between at least one pair of three-dimensional alignment structures (e.g., three-dimensional alignment structures 152, as described elsewhere herein). The at least one pair of three-dimensional alignment structures could be configured to secure the at least one cylindrical lens 150 to a predetermined location. In an example embodiment, the cylindrical lens 150 could be utilized to focus, defocus, direct, and/or otherwise couple the emitted light into the structure 136. In some embodiments, the cylindrical lens 150 could be approximately 100-200 microns in diameter. However, other diameters are possible and contemplated. In addition, lenses that are in other shapes could be used instead of, or in addition to, the at least one cylindrical lens 150.

As described above, the at least one spacer 140 and/or the at least one cylindrical lens 150 could include respective optical fibers. However, in other embodiments, the at least one spacer 140 and/or the at least one cylindrical lens 150 could include materials such as glass (silica), polycarbonate, polyethylene, fluoride, chalcogenides, and/or other optical materials. In yet other embodiments, the at least one spacer 140 need not be an optical material at all. In such scenarios, the at least one spacer 140 could be formed from silicon, ceramic, or another optically opaque material.

In various embodiments, the first substrate 110 could include one or more spring structures 160 on the first surface 112 of the first substrate 110. The spring structures 160 could provide a compliant, spring-like force in a direction normal to the surface of the first substrate 110. In some cases, the plurality of spring structures 160 could include a plurality of looped wire bonds. Other types of springs and/or spring-like structures are contemplated herein.

In example embodiments, the first substrate 110 and the second substrate 130 are coupled together such that: a) at least one light-emitter device of the plurality of light-emitter devices 120 is in physical contact with the at least one spacer 140; and b) at least one spring structure of the plurality of spring structures 160 is in physical contact with the at least one cylindrical lens 150.

In some embodiments, the optical system 100 could also include a driver circuit. The driver circuit is operable to cause the one or more light-emitter devices 120 to emit light. In such scenarios, at least a portion of the driver circuit could be disposed on the bridge structure.

Figure 2A:
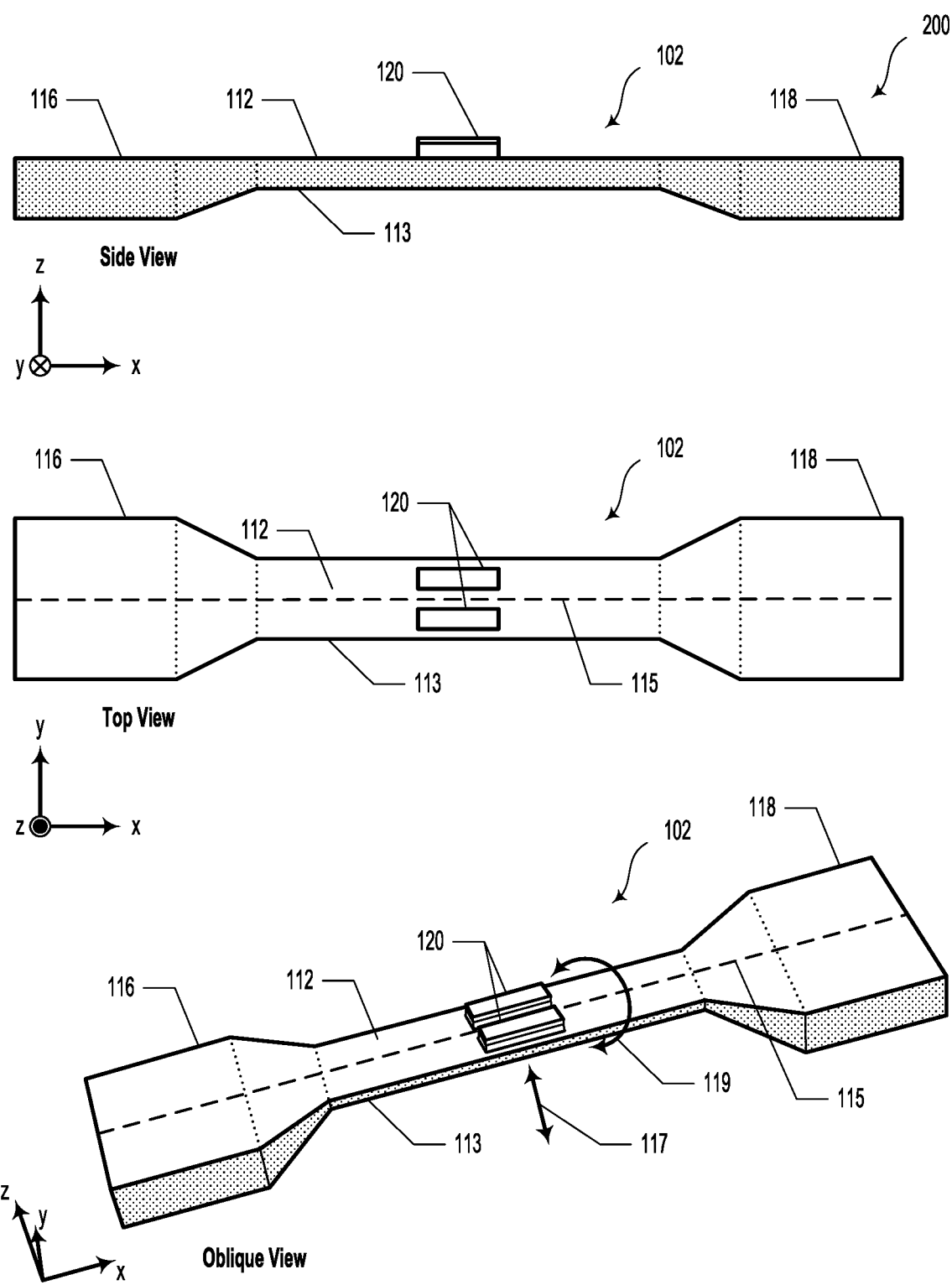
FIG. 2A illustrates a portion of an optical system, according to an example embodiment.
Figure 2B:
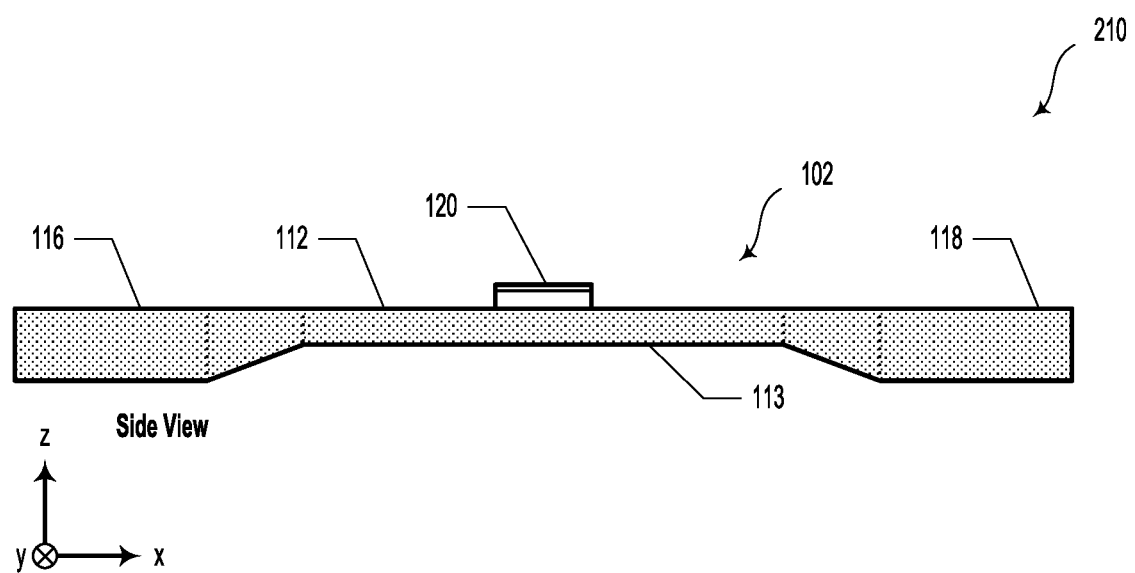
FIG. 2B illustrates a portion of an optical system, according to an example embodiment.
Figure 2B:
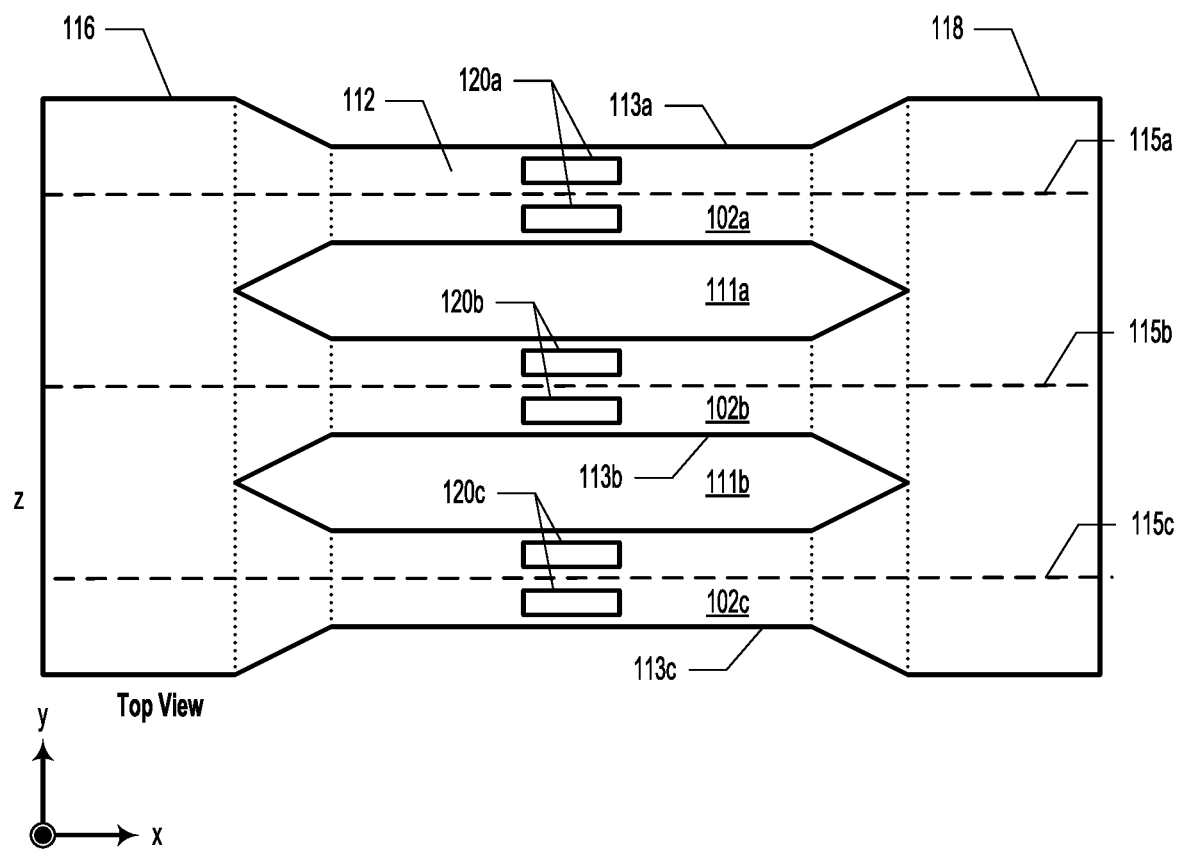
Figure 2C:
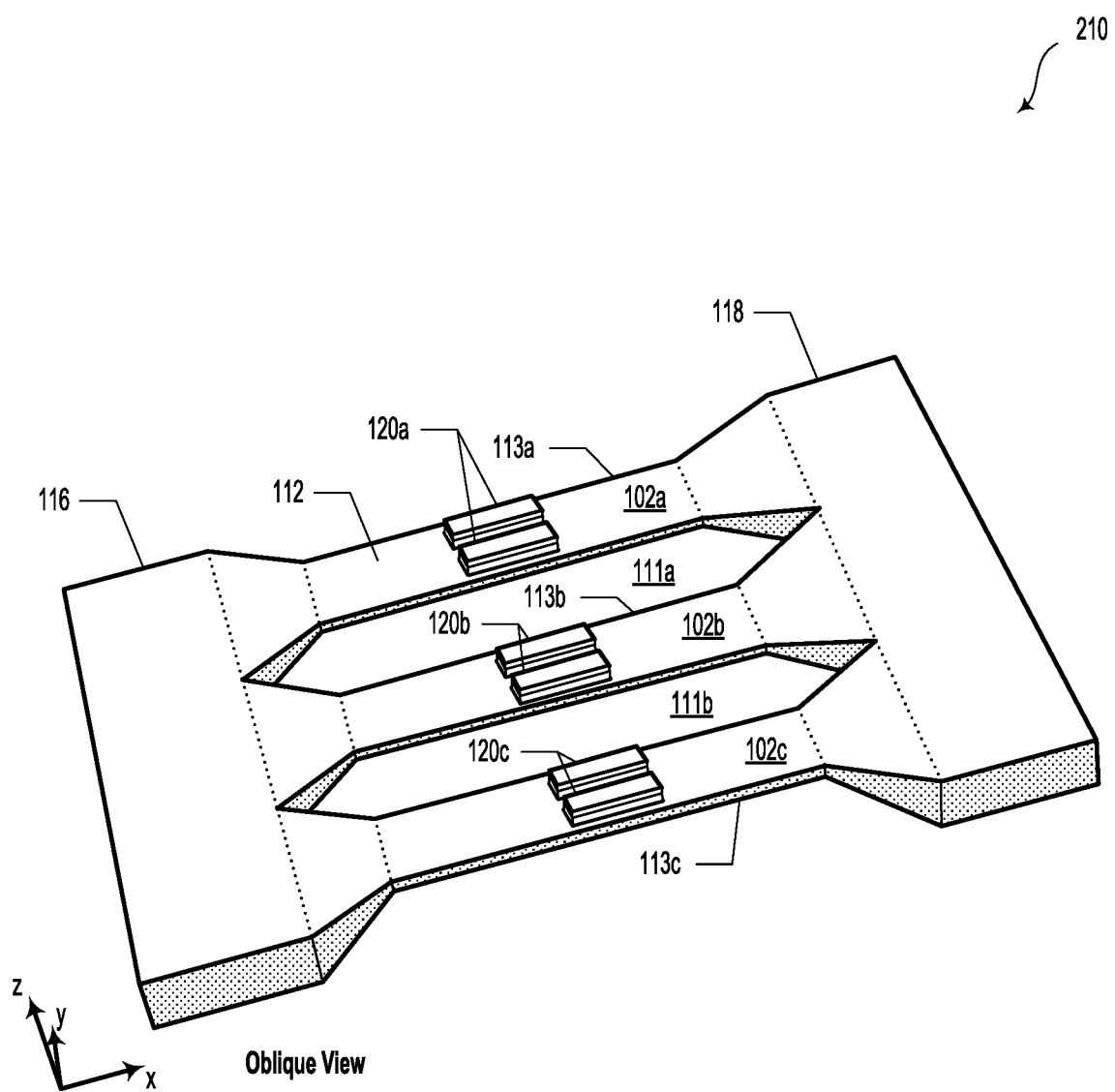
FIG. 2C illustrates a portion of an optical system, according to an example embodiment.

FIGS. 2A-2C illustrate various portions of an optical system, which could be similar or identical to optical system 100 as illustrated and described in reference to FIG. 1. FIG. 2A illustrates a portion 200 of an optical system, according to an example embodiment. Specifically, FIG. 2A shows various views of a bridge structure 102. The bridge structure 102 includes a first surface 112, a first support end 116, and a second support end 118. The bridge structure 102 includes an elongate member 113 that extends between the two support ends 116 and 118. Further, the elongate member 113 has a longitudinal axis 115. Additionally, two or more light-emitter devices 120 could be coupled to the elongate member 113 along the first surface 112 of the bridge structure 102. In some embodiments, the two or more light-emitter devices 120 could be disposed symmetrically about the longitudinal axis 115. As an example, two light-emitter devices 120 could be disposed at an equal distance from the longitudinal axis 115 along the first surface 112 of the bridge structure 102.

As illustrated in the oblique view of FIG. 2A, the bridge structure 102 and the elongate member 113 could be configured to bend according to a transverse mode with respect to the longitudinal axis (e.g., along a transverse axis 117 that is perpendicular to the longitudinal axis 115 and perpendicular to the first surface 112). Additionally, the bridge structure 102 could be configured to bend according to a torsional mode with respect to the longitudinal axis (e.g., in a twisting path 119 about the longitudinal axis 115). Other bending modes are possible and contemplated within the context of this disclosure.

FIG. 2B illustrates various views of a portion 210 of an optical system, according to an example embodiment. Specifically, the optical system could include a plurality of bridge structures 102a, 102b, and 102c that have, for example, a corresponding plurality of elongate members 113a, 113b, and 113c. As illustrated, the elongate members 113a, 113b, and 113c could be defined by cutouts 111a and 111b. In an example embodiment, cutouts 111a and 111b could include through-holes in the first substrate 110 that physically define the elongate members with respect to one another. Although FIG. 2B illustrates N–1 cutouts for N elongate members, it will be understood that a different relationship between the number of cutouts and number of elongate members could be utilized.

As shown, a pair of light-emitter devices 120a, 120b, and 120c could be coupled to the first surface 112 of each elongate member. In such an example, the elongate members 113a, 113b, and 113c could be configured to bend with respect to their respective longitudinal axes 115a, 115b, and 115c (e.g., according to torsional and/or transverse modes). In such a manner, minor variations in height, placement, and/or other non-uniformities could be compensated, at least in part, to provide better alignment between the plurality of light-emitter devices 120a, 120b, and 120c and other optical elements (e.g., the cylindrical lens 150 and/or the structure 136) in the optical system 100.

FIG. 2C illustrates an oblique view of the portion 210 of the optical system, according to an example embodiment. As illustrated in FIGS. 2B and 2C, the plurality of elongate members 113a, 113b, and 113c could include undercut regions such that could include a reduced thickness for at least a portion of the bridge structures 102a, 102b, and 102c. However, some embodiments need not include an undercut region.

Figure 2D:
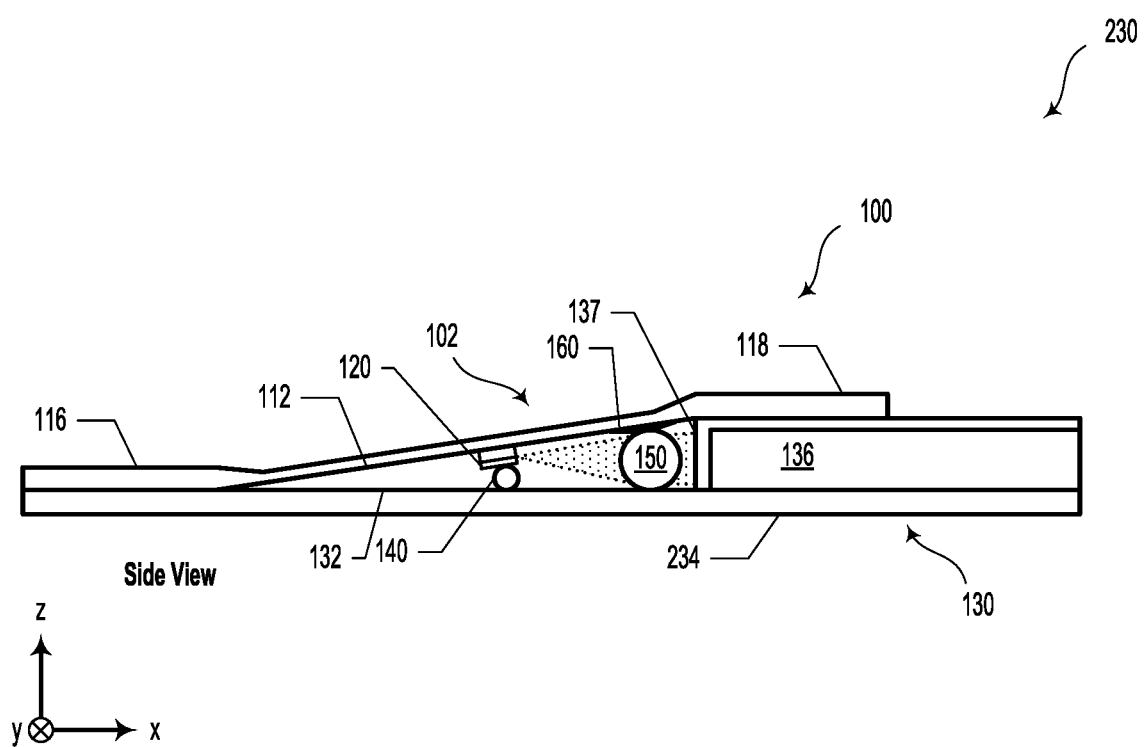
FIG. 2D illustrates an optical system, according to an example embodiment.
Figure 2D:
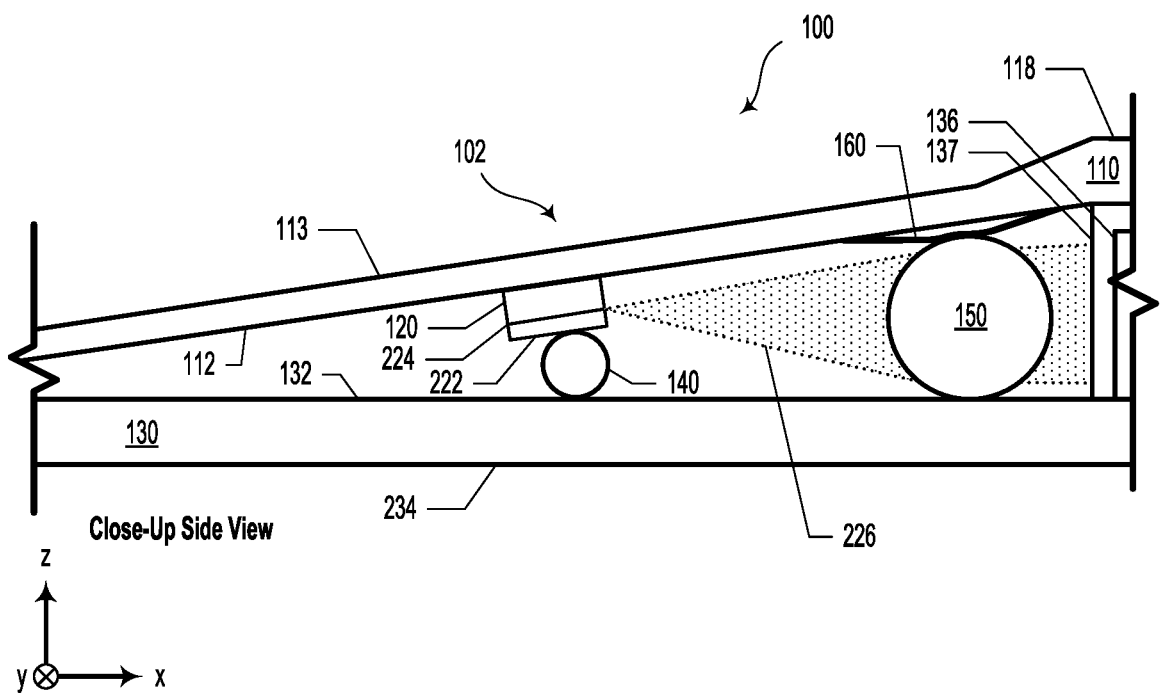

FIG. 2D illustrates a side view and close-up side view of optical system 230, according to an example embodiment. Optical system 230 could be similar or identical to optical system 100, as illustrated and described in reference to FIG. 1. For example, optical system 230 includes a first substrate 110 and a second substrate 130. A plurality of light-emitter devices 120 are coupled to a bridge structure 102 along a first surface 112 of the first substrate 110. While FIG. 2D illustrates a single light-emitter device 120, in some embodiments, the light-emitter device 120 could include a plurality of light-emitter devices (e.g., 256 or more laser bars). In an example embodiment, the plurality of light-emitter devices could extend "into the page" along the y-axis.

In some embodiments, a plurality of spring structures 160 could be coupled to the first surface 112 of the first substrate 110. While FIG. 2D illustrates a single spring structure 160, in some embodiments, the optical system 230 could include a plurality of spring structures (e.g., 10, 50, 100, or more spring structures). In an example embodiment, the plurality of spring structures 160 could extend "into the page" along the y-axis.

The second substrate 130 has a mounting surface 132 upon which is mounted a spacer 140, a cylindrical lens 150, a structure 136, and an optical spacer 137. In an example embodiment, the cylindrical lens 150 could be disposed along the mounting surface 132 and between the spacer 140 and the structure 136. The spacer 140 and the cylindrical lens 150 could be cylindrically-shaped and extend along the y-axis as illustrated in FIG. 2D. However, other shapes and arrangements of the spacer 140, cylindrical lens 150, structure 136, and optical spacer 137 are possible and contemplated. In some embodiments, the second substrate 130 could be partially transparent. As an example, the second substrate 130 could be glass or another material that is substantially optically-transparent in the visible wavelengths and/or the wavelengths of light emitted by the light-emitter devices.

As illustrated in FIG. 2D, the first substrate 110 is directly coupled to the second substrate 130 at least at two locations: 1) a first portion (e.g., a portion adjacent to or including support end 116) of the first substrate 110 could be coupled to the mounting surface 132 of the second substrate 130; and 2) a second portion (e.g., a portion adjacent to or including support end 118) of the first substrate 110 could be coupled to the optical spacer 137 on the second substrate 130. In such a scenario, the first surface 112 of bridge structure 102 faces the mounting surface 132.

In some embodiments, coupling the first substrate 110 to the second substrate 130 could include bonding the two substrates using an epoxy or another optical adhesive material. Coupling the first substrate 110 and the second substrate 130 as illustrated in FIG. 2D could cause a top surface 222 of the at least one light-emitter device 120 to physically contact the spacer 140. As such, the spacer 140 could be configured to act as a "land" or stop for the light-emitter device 120 in the z-direction. That is, the spacer 140 could control the z-height of the light-emitter device 120 when the first substrate 110 is coupled to the second substrate 130.

As an example, the bridge structure 102 could bend with respect to its longitudinal axis so as to balance the forces. In other words, the bridge structure 102 could bend according to a transverse and/or torsional mode with respect to the longitudinal axis.

The light-emitter device 120 could include an epitaxially-grown laser diode region 224. The laser diode region 224 could include semiconductor material from which photons are emitted with a particular emission pattern. By controlling the z-height of the light-emitter device 120, the location of the emission pattern 226 of the epitaxially-grown laser diode region 224 can be positioned so as to interact with the cylindrical lens 150. That is, by moving either the light-emitter device 120 or the cylindrical lens 150, their relative position can be adjusted with respect to one another. Additionally or alternatively, a diameter of the cylindrical lens 150 could be varied (e.g., by selecting a different diameter optical fiber) to obtain a desired focus.

Additionally, coupling the first substrate 110 to the second substrate 130 could cause a spring structure 160 to physically contact the cylindrical lens 150. That is, at least a portion of the spring structure 160 could push downward (in the −z direction) onto an outer surface of the cylindrical lens 150. In so doing, the spring structure 160 could help retain and/or position the cylindrical lens 150 at a desired location.

III. Example Methods

FIGS. 3A-3G illustrate various steps of a method of manufacture, according to one or more example embodiments. It will be understood that at least some of the various steps may be carried out in a different order than of that presented herein. Furthermore, steps may be added, subtracted, transposed, and/or repeated. FIGS. 3A-3G may serve as example illustrations for at least some of the steps or blocks described in relation to method 400 as illustrated and described in relation to FIG. 4. Additionally, some steps of FIGS. 3A-3G may be carried out so as to provide optical system 100, as illustrated and described in reference to FIGS. 1 and 2D.

Figure 3A:
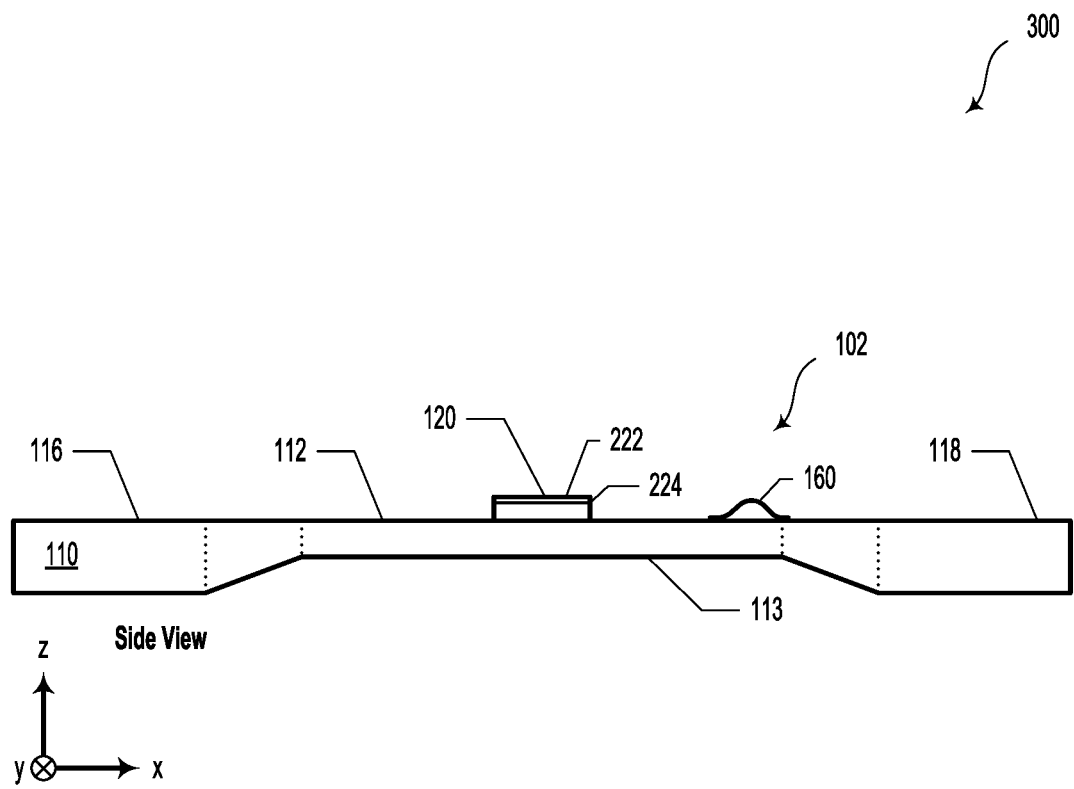
FIG. 3A illustrates a step of a method of manufacture, according to an example embodiment.

FIG. 3A illustrates a step of a method of manufacture 300, according to an example embodiment. Step 300 includes providing a first substrate 110. As illustrated, a first substrate 110 could include a first surface 112. The first substrate 110 could be shaped to form at least one bridge structure 102. The bridge structure 102 could include an elongate member 113 extending between a first support end 116 and a second support end 118. In some embodiments, the elongate member 113 could be formed by removing at least a portion of the first substrate 110 using methods such as laser cutting, mechanical routing, and/or dry or wet etching processes. In some examples, the elongate member 113 could be defined by cutouts in the first surface 112 (e.g., in the x-y plane). Additionally or alternatively, the elongate member 113 could be defined by an undercut portion in which a backside portion of the first substrate 110 is partially or completely removed. The bridge structure(s) 102 could additionally or alternatively be formed using additive techniques (3D printing, etc.).

One or more light-emitter devices 120 could be disposed on the first surface 112. While FIG. 3A illustrates a single light-emitter device 120, it will be understood that further light-emitter devices could be provided along the "into the page" direction (e.g., extending along the y-axis). In some embodiments, an epitaxially-grown laser diode region 224 could be located a known distance below a top surface 222 of the light-emitter devices 120. A plurality of spring structures 160 could be placed on the first surface 112. For example, the spring structures 160 could include wire bonds applied to the first surface 112 using a wire bonder.

Figure 3B:
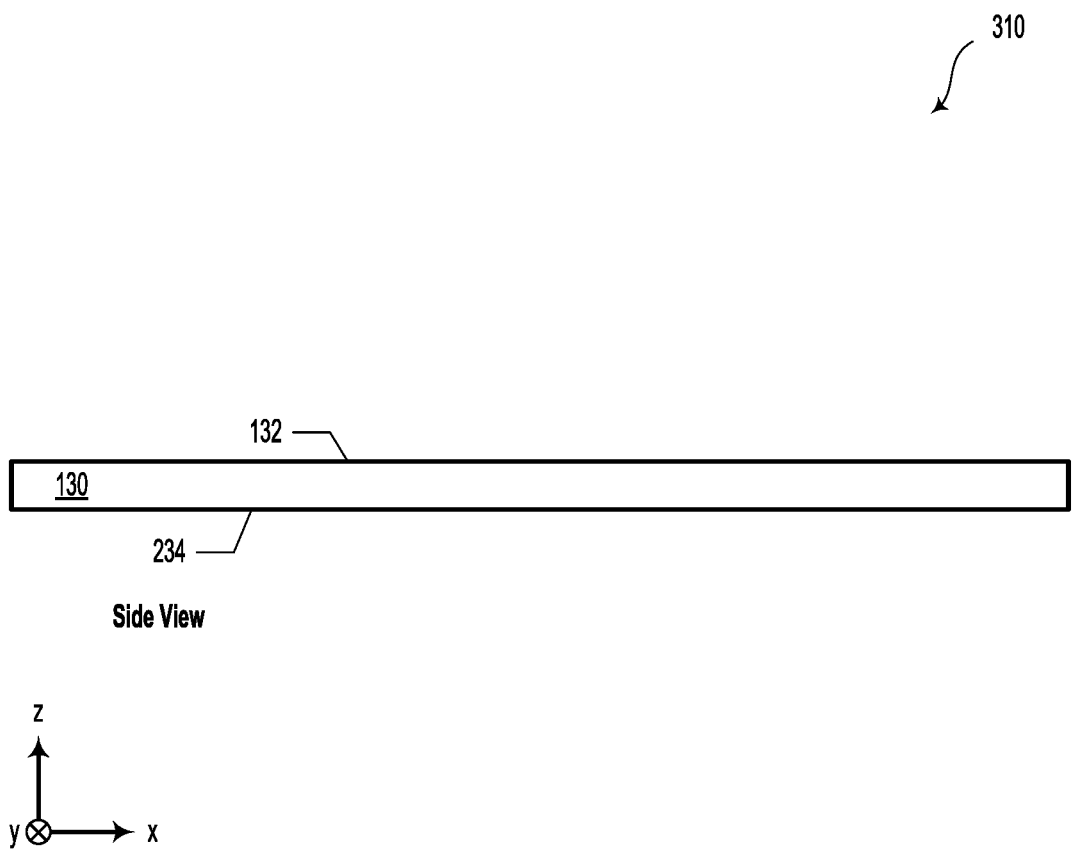
FIG. 3B illustrates a step of a method of manufacture, according to an example embodiment.

FIG. 3B illustrates a step of a method of manufacture 310, according to an example embodiment. Step 310 includes providing a second substrate 130. The second substrate 130 includes a mounting surface 132 and a backside surface 234. In some embodiments, the second substrate 130 may be partially or completely transparent. For instance, the second substrate 130 could be formed from glass or another material that is substantially transparent to visible light and/or the wavelengths of light emitted by the light-emitter devices.

Figure 3C:
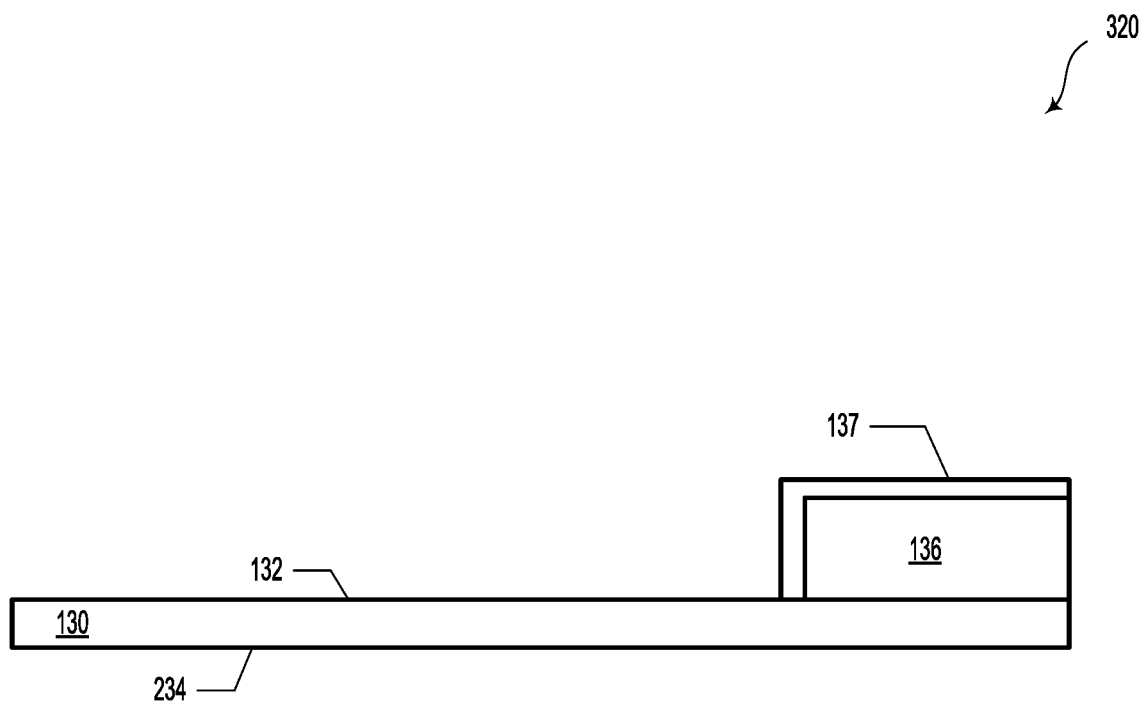
FIG. 3C illustrates a step of a method of manufacture, according to an example embodiment.
Figure 3C:
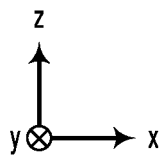

FIG. 3C illustrates a step of a method of manufacture 320, according to an example embodiment. Step 320 includes forming a structure 136 and optical spacer 137 on the mounting surface 132. In some embodiments, forming the structure 136 could include one or more photolithography exposures to define a photo-definable resist material. In some embodiments, the structure 136 could be an optical waveguide configured to guide light via, e.g., total internal reflection. As described herein, the optical spacer 137 could be formed from stainless steel or other materials with similar properties.

Figure 3D:
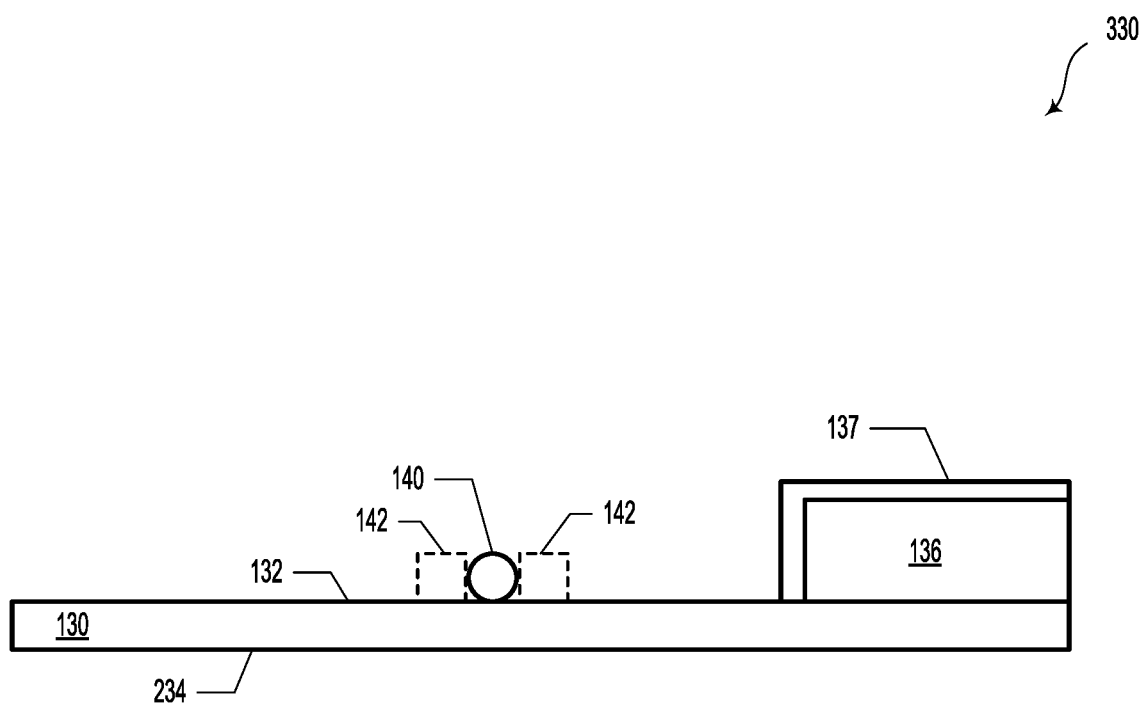
FIG. 3D illustrates a step of a method of manufacture, according to an example embodiment.
Figure 3D:
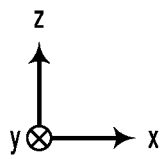

FIG. 3D illustrates a step of a method of manufacture 330, according to an example embodiment. Step 330 includes coupling a spacer 140 to the mounting surface 132 of the second substrate 130. In some embodiments, coupling the spacer 140 to the mounting surface 132 could include using a pick-and-place system to position the spacer 140 in a desired location along the mounting surface 132. Additionally or alternatively, the spacer 140 could be coupled to the mounting surface 132 using epoxy or another adhesive material.

In some embodiments, three-dimensional alignment structures 142 could be applied to the mounting surface before or after the spacer 140 is positioned along the mounting surface 132. The alignment structures 142 could help to properly position the spacer 140 and/or help maintain its position. In some cases, the alignment structures 142 could be positioned to form a slot for the spacer 140. In other words, the alignment structures 142 could grip the spacer 140 so as to affix or fasten it in place. The alignment structures 142 could be defined using photolithography. For example, the alignment structures 142 could be formed with a photo-definable material.

Figure 3E:
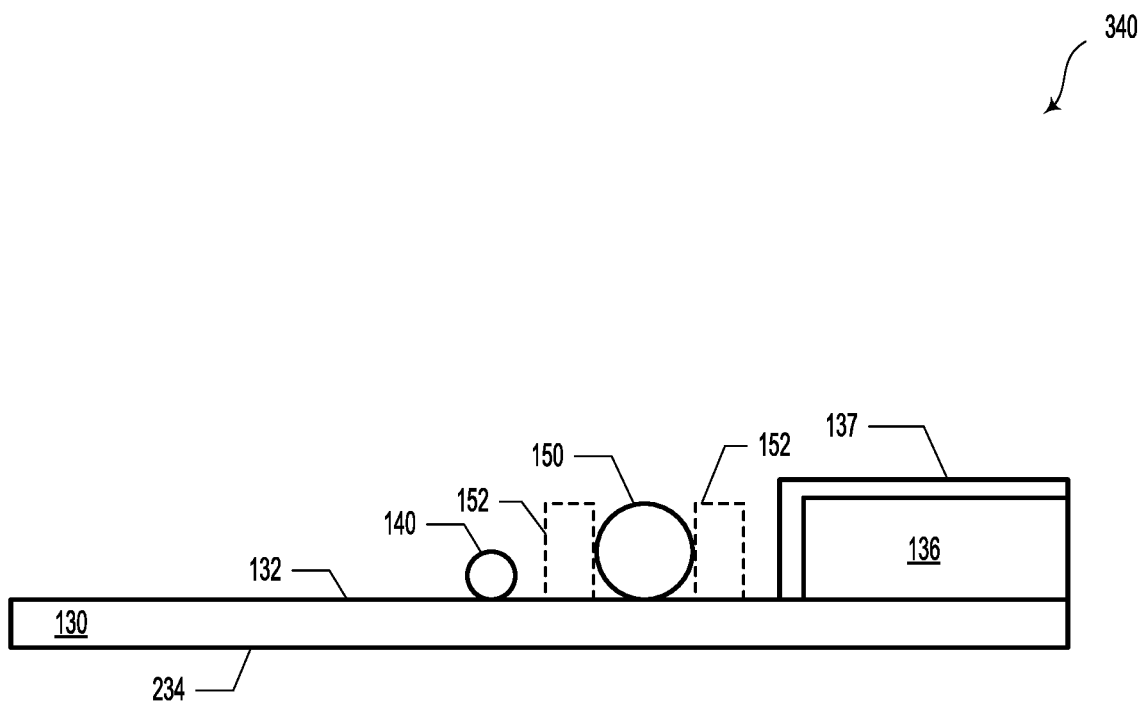
FIG. 3E illustrates a step of a method of manufacture, according to an example embodiment.
Figure 3E:
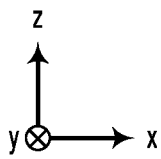

FIG. 3E illustrates a step of a method of manufacture 340, according to an example embodiment. Step 340 includes coupling a cylindrical lens 150 to the mounting surface 132 of the second substrate 130. In some embodiments, coupling the cylindrical lens 150 to the mounting surface 132 could include using a pick-and-place system to position the cylindrical lens 150 in a desired location along the mounting surface 132. Additionally or alternatively, the cylindrical lens 150 could be coupled to the mounting surface 132 using epoxy or another adhesive material.

In some embodiments, three-dimensional alignment structures 152 could be applied to the mounting surface before or after the cylindrical lens 150 is positioned along the mounting surface 132. The alignment structures 152 could help to properly position the cylindrical lens 150 and/or help maintain its position. In some cases, the alignment structures 152 could be positioned to form a slot for the cylindrical lens 150. In other words, the alignment structures 152 could grip the cylindrical lens 150 so as to affix or fasten it in place. The alignment structures 152 could be defined using photolithography. For example, the alignment structures 152 could be formed with a photo-definable material.

Figure 3F:
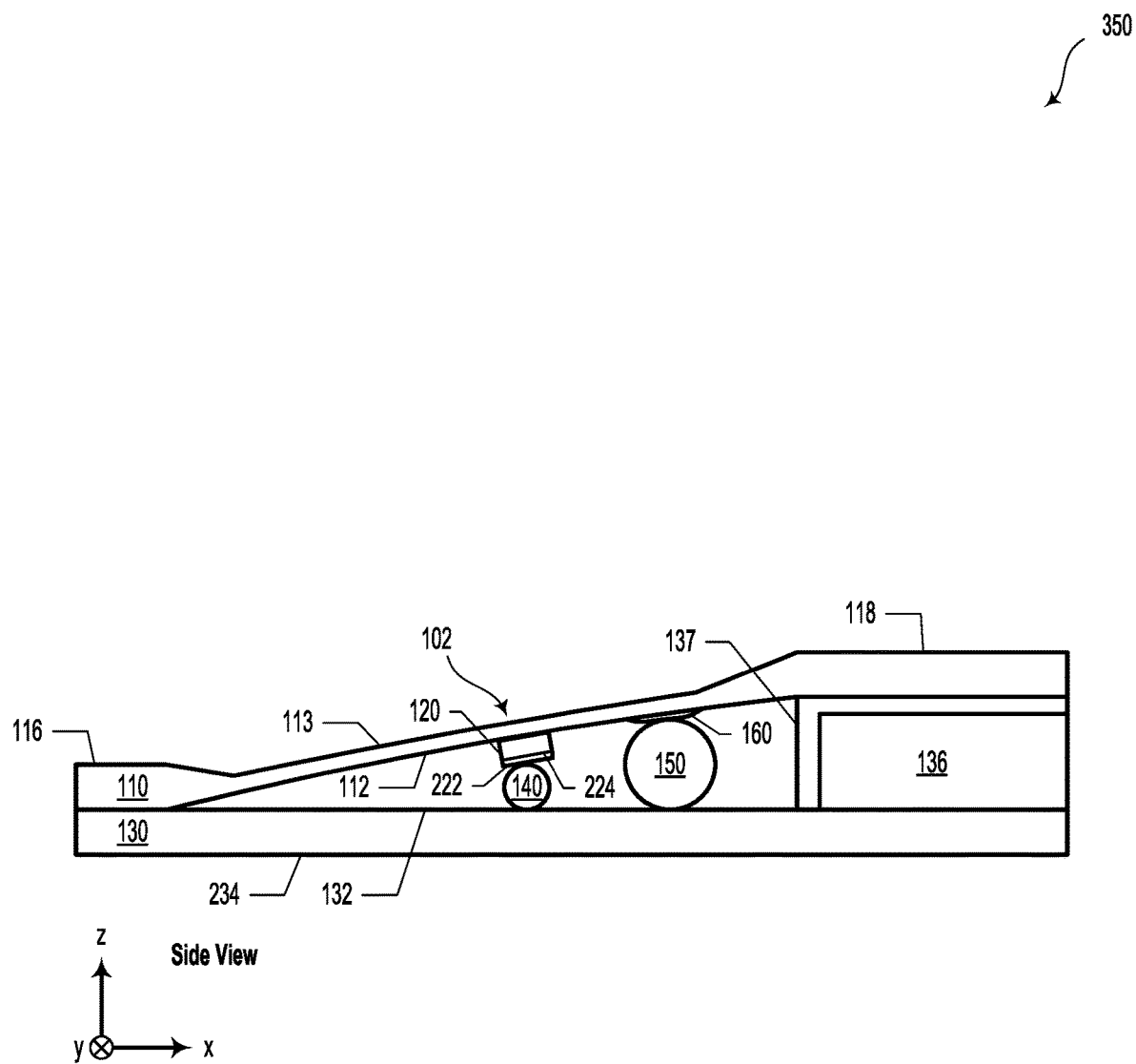
FIG. 3F illustrates a step of a method of manufacture, according to an example embodiment.

FIG. 3F illustrates a step of a method of manufacture 350, according to an example embodiment. Step 350 includes the first substrate 110 being coupled to the second substrate 130. For example, the first support end 116 of the bridge structure 102 could be coupled to the mounting surface 132 of the second substrate 130 and the second support end 118 of the bridge structure 102 could be coupled to the optical spacer 137. In so doing, the first surface 112 of the first substrate 110 faces the mounting surface 132.

When coupling the first substrate 110 to the second substrate 130, the one or more light-emitter devices 120 could come into physical contact with the spacer 140. That is, a respective top surface 222 of the plurality of light-emitter devices 120 could push against the spacer 140. Furthermore, as a result of coupling the first substrate 110 and the second substrate 130, the cylindrical lens 150 could come into physical contact with the spring structures 160. In some embodiments, the spring structures 160 may bend so as to compliantly provide a force to a surface of the cylindrical lens 150.

In this arrangement, an epitaxially-grown laser diode region 224 could be uniformly and more-reliably positioned with respect to the cylindrical lens 150 such that the laser diode region 224 emits light that is fast-axis collimated by the cylindrical lens 150.

In some embodiments, the first substrate 110 may bend due to one or more physical forces exerted upon it. For example, the first surface 112 and the second surface 114 could be bent with respect to a pre-coupling condition of the first substrate 110. That is, prior to coupling the first substrate 110 to the second substrate 130, the first substrate 110 may be substantially planar. However, after coupling the first substrate 110 to the second substrate 130, at least a portion of the first substrate 110 may bend to balance the forces exerted upon the top surface 222 of the light-emitter device 120 by the spacer 140 and/or the forces exerted upon the cylindrical lens 150 by the spring structure 160, and vice versa.

More specifically, the bridge structure 102 could bend and/or flex due to the forces. For example, the bridge structure 102 could twist about a longitudinal axis of the elongate member 113 so as to accommodate various heights of the light-emitter devices 120. Additionally or alternatively, the bridge structure 102 could bend away from the mounting surface 132 due to the physical forces applied when coupling the first substrate 110 to the second substrate 130.

In some examples, the first substrate 110 and/or the bridge structure 102 may be "pre-bent" prior to coupling it with the second substrate 130. In such a scenario, the first substrate 110 and/or the bridge structure 102 could be plastically deformed with heat and/or pressure so as to more compliantly couple with the second substrate 130. For example, the first clamped end 116 of the first substrate 110 and the second clamped end 118 of the first substrate 110 could be pre-bent so as to reduce delamination issues after coupling with the second substrate 130. Other "pre-bending" steps are contemplated so as to reduce or eliminate physical stresses on the first substrate 110, the bridge structure 102, the second substrate 130, and/or other components of the optical system 100.

Figure 3G:
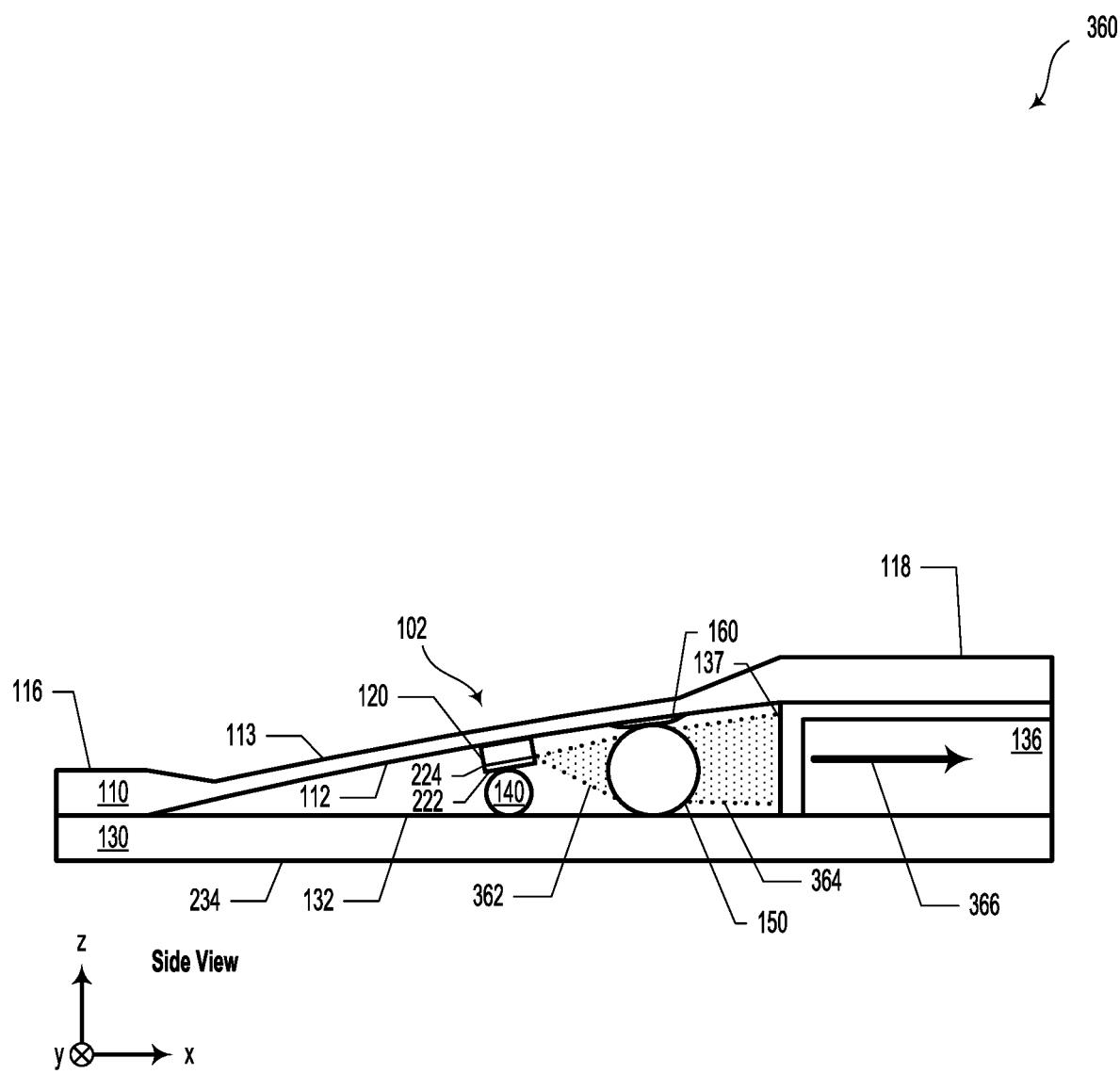
FIG. 3G illustrates a step of a method of manufacture, according to an example embodiment.

FIG. 3G illustrates a step of a method of manufacture 360, according to an example embodiment. Step 360 could include causing the one or more light-emitter devices 120 to emit light according to an emission pattern 362. At least a portion of the emission pattern 362 could interact with the cylindrical lens 150 to form focused light 364. In such a scenario, the focused light 364 could be coupled into the structure 136 and be propagated within the structure 136 along the x-direction as guided light 366. The guided light 366 could be imaged elsewhere in the optical system using, for example, one or more photodetectors (e.g., a camera). Step 360 could be utilized, for example, as a calibration step during manufacturing or periodically during normal operation to check proper alignment of the components of the optical system 100.

Figure 4:
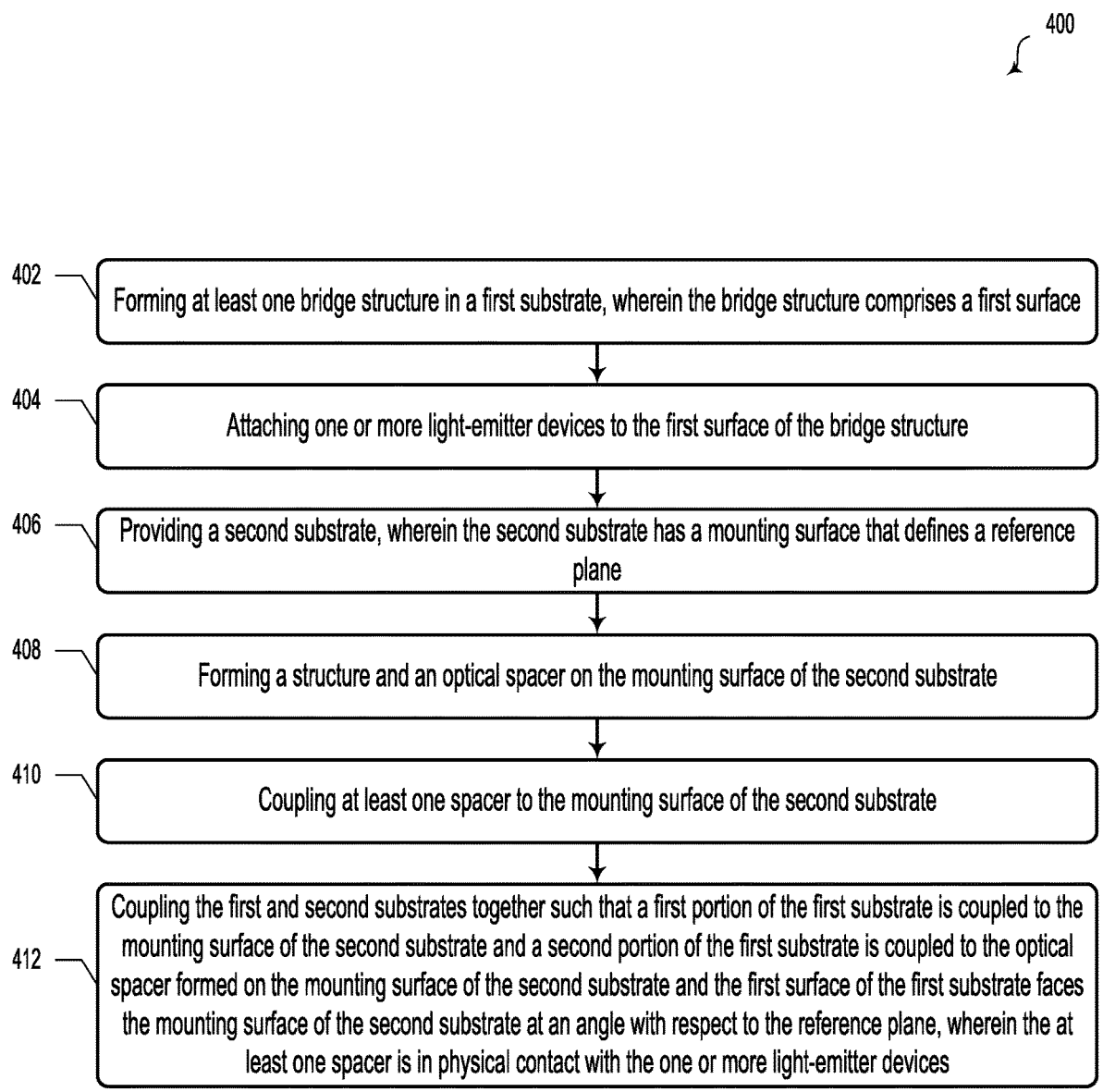
FIG. 4 illustrates a method, according to an example embodiment.

FIG. 4 illustrates a method 400, according to an example embodiment. Method 400 could represent a process flow for a method of manufacture and may be carried out, at least in part, by way of some or all of the manufacturing steps or stages illustrated and described in reference to FIGS. 3A-3G. It will be understood that the method 400 may include fewer or more steps or blocks than those expressly disclosed herein. Furthermore, respective steps or blocks of method 400 may be performed in any order and each step or block may be performed one or more times. In some embodiments, method 400 and its steps or blocks may be performed to provide an optical system that could be similar or identical to optical system 100, as illustrated and described in reference to FIGS. 1 and 2A-2D.

Block 402 includes forming at least one bridge structure in a first substrate that has a first surface. In some examples, the first substrate could include a printed circuit board. However, other materials are contemplated.

In some embodiments, forming at least one bridge structure in the first substrate could include lithographically-defining at least one cutout in the first substrate. The at least one cutout could include an opening in the first substrate. For example, the bridge structure could be defined by two cutouts. In such scenarios, the bridge structure could include an elongate member and two clamped ends.

Furthermore, in some embodiments, forming at least one bridge structure in the first substrate could include forming a plurality of bridge structures defined by a plurality of cutouts.

Block 404 includes attaching one or more light-emitter devices to the first surface of the bridge structure. In some embodiments, method 400 could include using a pick-and-place system to position the light-emitter devices on the first surface. In some scenarios, the light-emitter devices could be bonded to the first surface with epoxy, an indium eutectic material, or another type of adhesive material.

Block 406 includes providing a second substrate that has a mounting surface that defines a reference plane. The second substrate could include at least one portion that is transparent so as to provide an alignment window for aligning the second substrate with the first substrate as described below.

Block 408 includes forming a structure and an optical spacer on the mounting surface of the second substrate. In some embodiments, forming the structure on the mounting surface of the second substrate comprises performing a photolithographic process to define the structure with a photolithographically-definable material. In some embodiments, the structure could include an optical waveguide that could be formed from SU-8 or another optical material. As described elsewhere herein, the optical spacer could be formed from stainless steel and could provide a scaffolding to maintain an air gap around the structure.

Block 410 includes coupling at least one spacer to the mounting surface of the second substrate. In some embodiments, coupling the at least one spacer to the mounting surface could include using a pick-and-place machine to position the at least one spacer in the desired location on the second substrate. As described elsewhere herein, the at least one spacer could include an optical fiber. However, other materials and shapes are possible and contemplated.

In some embodiments, coupling the at least one spacer to the mounting surface of the second substrate could include coupling the at least one spacer to a plurality of three-dimensional alignment structures on the mounting surface of the second substrate.

Block 412 includes coupling the first and second substrates together such that a first portion of the first substrate is coupled to the mounting surface of the second substrate and a second portion of the first substrate is coupled to the optical spacer formed on the mounting surface of the second substrate and the first surface of the first substrate faces the mounting surface of the second substrate at an angle with respect to the reference plane. In such scenarios, the at least one spacer is in physical contact with the one or more light-emitter devices.

In some embodiments, the structure formed on the mounting surface of the second substrate could be an optical waveguide. In such scenarios, coupling the first and second substrates together could include optically coupling at least one light-emitter device of the plurality of light-emitter devices to the optical waveguide via the at least one cylindrical lens.

In example embodiments, coupling the first and second substrates together includes bringing the one or more light-emitter devices into physical contact with the at least one spacer.

Method 400 could additionally include coupling at least one cylindrical lens to the mounting surface of the second substrate. In such scenarios, the one or more light-emitter devices could be disposed along an optical axis toward the at least one cylindrical lens. In some embodiments, coupling the at least one cylindrical lens to the mounting surface of the second substrate could include coupling the at least one cylindrical lens to a plurality of three-dimensional alignment structures on the mounting surface of the second substrate.

In some embodiments, method 400 may additionally include aligning the first substrate and the second substrate with respect to one another before coupling the first and second substrates together. In such scenarios, coupling the first and second substrates together could include applying an adhesive material to one or both of the first and the second substrate and applying a predetermined contact force (e.g., 1-100 N, or more).

Method 400 could additionally include electrically-connecting the light-emitter devices to control circuitry (e.g., pulser circuits), which could be located on the bridge structure(s) or elsewhere. For example, electrically-connecting the light-emitter devices to their respective control circuits could include forming one or more wire bonds between them using a wire or ribbon bonder system.

Method 400 could include forming a plurality of spring structures on the first surface of the first substrate. In such scenarios, coupling the first and second substrates together could include bringing at least one spring structure of the plurality of spring structures into physical contact with the at least one cylindrical lens. In some cases, the plurality of spring structures could include a plurality of looped wire bonds. That is, method 400 could include the step of applying the plurality of looped wire bonds to the first surface of the first substrate (e.g., with a wire bonding system).

In some embodiments, coupling the first and second substrates together could include applying an adhesive material to at least one of the first portion of the first substrate or the mounting surface of the second substrate. In such scenarios, the method 400 could include applying the adhesive material to at least one of the second portion of the first substrate or the optical spacer formed on the mounting surface of the second substrate. Furthermore, method 400 could include curing the adhesive material such that the first portion of the first substrate is bonded to the mounting surface of the second substrate and the second portion of the first substrate is bonded to the optical spacer formed on the mounting surface of the second substrate.

Method 400 may include aligning the first substrate and the second substrate with respect to one another before coupling the first and second substrates together. For instance, in some embodiments where the second substrate includes a transparent portion, aligning the first substrate and the second substrate with respect to one another could include imaging at least a portion of the first substrate through the transparent portion of the second substrate. Furthermore, in such scenarios, aligning the first substrate and the second substrate with respect to one another may include adjusting a position of the first substrate with respect to the second substrate to achieve a desired alignment of the first and second substrates.

Additionally or optionally, coupling the first and second substrates together could include applying a predetermined force (e.g., between 1 Newton to 100 Newtons) to the second surface of the first substrate. Other values of force are contemplated and possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system, comprising:
   a first substrate, wherein the first substrate comprises at least one bridge structure, and wherein one or more light-emitter devices are disposed on the at least one bridge structure;
   a second substrate, wherein the second substrate has a mounting surface; and
   at least one spacer coupled to the mounting surface, wherein a first portion of the first substrate is coupled to the at least one spacer on the mounting surface of the second substrate, and wherein the first substrate faces the mounting surface of the second substrate at an angle, and wherein the at least one spacer is in physical contact with the one or more light-emitter devices.

2. The optical system of claim 1, wherein the first substrate comprises a printed circuit board.

3. The optical system of claim 1, wherein the bridge structure is defined by at least one cutout, wherein the at least one cutout comprises an opening in the first substrate.

4. The optical system of claim 3, wherein the bridge structure is defined by two cutouts, wherein the bridge structure comprises an elongate member extending between a first support end and a second support end.

5. The optical system of claim 4, wherein the first and second support ends define a plane and the elongate member is deformable with respect to the plane.

6. The optical system of claim 3, comprising a plurality of bridge structures defined by a plurality of cutouts.

7. The optical system of claim 1, wherein the bridge structure comprises a longitudinal axis, wherein the bridge structure is configured to bend according to a transverse mode with respect to the longitudinal axis.

8. The optical system of claim 1, wherein the bridge structure comprises a longitudinal axis, wherein the bridge structure is configured to bend according to a torsional mode with respect to the longitudinal axis.

9. The optical system of claim 1, further comprising an optical waveguide coupled to the mounting surface.

10. The optical system of claim 1, further comprising at least one cylindrical lens coupled to the mounting surface, wherein the at least one spacer comprises an optical fiber spacer, wherein the at least one cylindrical lens comprises an optical fiber lens having a radius greater than that of the optical fiber spacer.

11. The optical system of claim 1, further comprising at least one cylindrical lens coupled to the mounting surface, wherein the one or more light-emitter devices are arranged to emit light towards the at least one cylindrical lens.

12. The optical system of claim 1, further comprising a driver circuit, wherein the driver circuit is operable to cause the one or more light-emitter devices to emit light, wherein at least a portion of the driver circuit is disposed on the bridge structure.

13. A light detection and ranging (LIDAR) system, comprising:
an optical system, comprising:
a first substrate, wherein the first substrate comprises at least one bridge structure, and wherein one or more light-emitter devices are disposed on the at least one bridge structure;
a second substrate, wherein the second substrate has a mounting surface; and
at least one spacer coupled to the mounting surface,
wherein a first portion of the first substrate is coupled to the at least one spacer on the mounting surface of the second substrate, and wherein the first substrate faces the mounting surface of the second substrate at an angle, and
wherein the at least one spacer is in physical contact with the one or more light-emitter devices.

14. The LIDAR system of claim 13, wherein the LIDAR system is coupled to a vehicle, and wherein the LIDAR system is configured to provide information about an environment around the vehicle.

15. A method of manufacturing an optical system, the method comprising:
forming at least one bridge structure in a first substrate;
attaching one or more light-emitter devices to the bridge structure;
providing a second substrate, wherein the second substrate has a mounting surface;
coupling at least one spacer to the mounting surface of the second substrate;
coupling a first portion of the first substrate to the mounting surface of the second substrate; and
coupling a second portion of the first substrate to the at least one spacer on the mounting surface of the second substrate, wherein the first substrate faces the mounting surface of the second substrate at an angle, wherein the at least one spacer is in physical contact with the one or more light-emitter devices.

16. The method of claim 15, wherein forming at least one bridge structure in the first substrate comprises lithographically-defining at least one cutout in the first substrate, wherein the at least one cutout comprises an opening in the first substrate.

17. The method of claim 16, wherein the bridge structure is defined by two cutouts, wherein the bridge structure comprises an elongate member and two clamped ends.

18. The method of claim 16, wherein forming at least one bridge structure in the first substrate comprises forming a plurality of bridge structures defined by a plurality of cutouts.

19. The method of claim 15, further comprising coupling at least one cylindrical lens to the mounting surface of the second substrate, wherein the one or more light-emitter devices are disposed along an optical axis toward the at least one cylindrical lens.

20. The method of claim 15, further comprising: aligning the first substrate and the second substrate with respect to one another before coupling the first and second substrates together, wherein coupling the first and second substrates together comprises:
applying an adhesive material to one or both of the first and the second substrate; and
applying a predetermined contact force.

* * * * *